Figure 1:
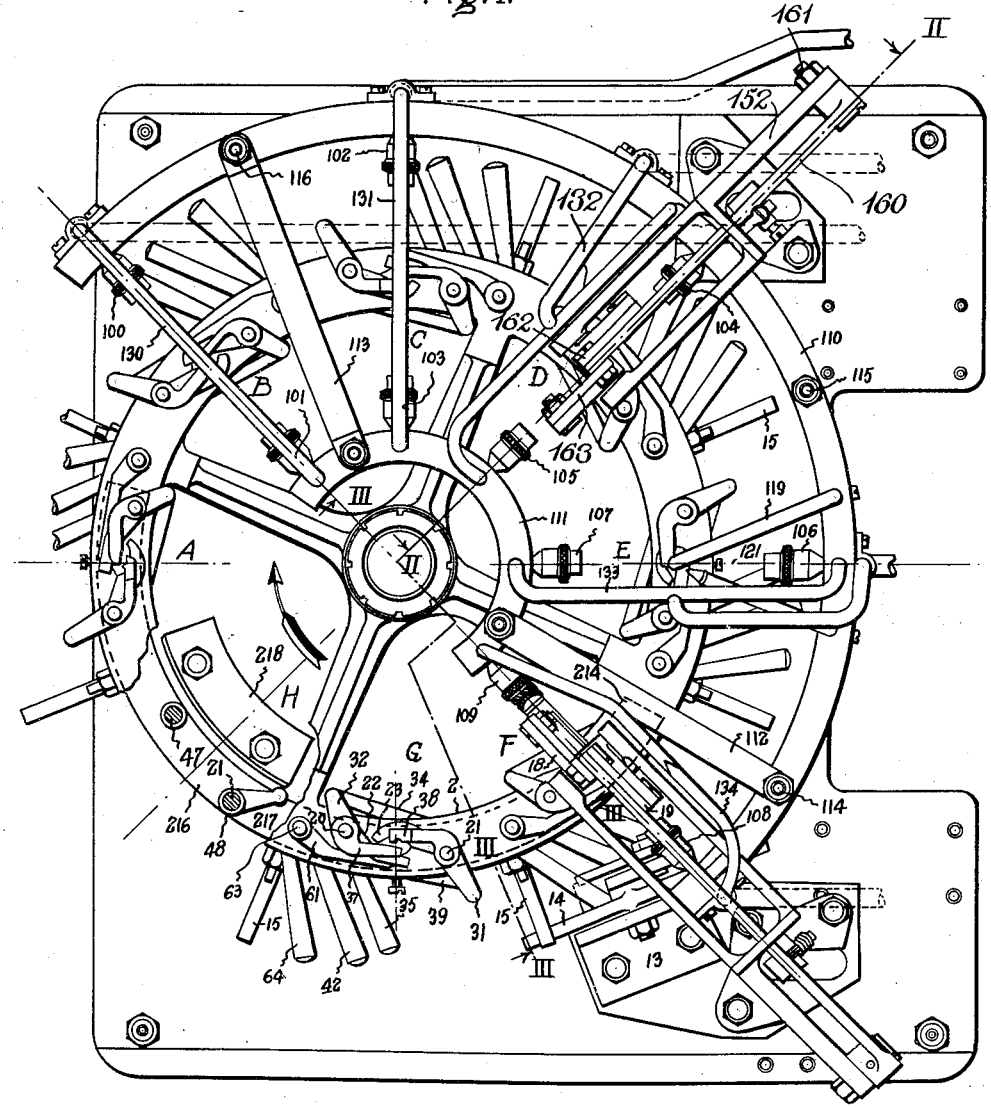

Aug. 30, 1927.

H. DE JONG 1,640,442

STEM MAKING MACHINE

Filed July 9, 1924 6 Sheets-Sheet 1

Inventor:
Hendrik de Jong,
by
His Attorney.

Aug. 30, 1927. 1,640,442
H. DE JONG
STEM MAKING MACHINE
Filed July 9, 1924     6 Sheets-Sheet 3

Inventor:
Hendrik de Jong,
by
His Attorney.

Aug. 30, 1927.
H. DE JONG
1,640,442
STEM MAKING MACHINE
Filed July 9, 1924
6 Sheets-Sheet 4
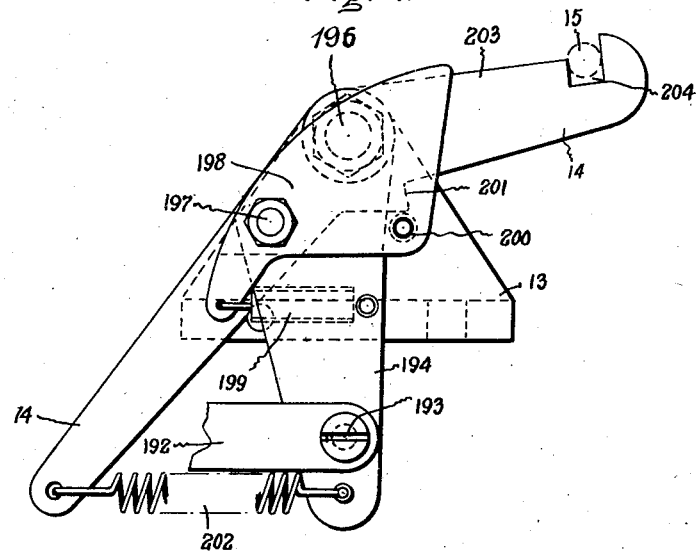
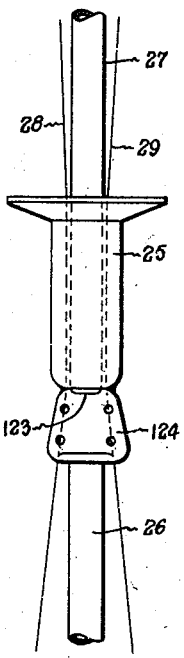
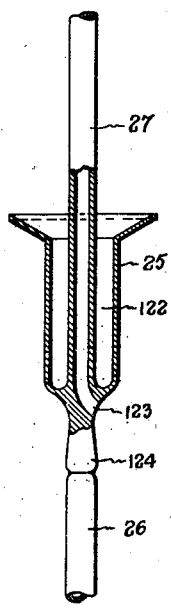
Inventor:
Hendrik de Jong
by *Alexander S. Lind*
His Attorney.

Aug. 30, 1927.

H. DE JONG 1,640,442

STEM MAKING MACHINE

Filed July 9, 1924 6 Sheets-Sheet 5

Inventor:
Hendrik de Jong,
by *Alexander S. —*
His Attorney.

Aug. 30, 1927.

H. DE JONG 1,640,442

STEM MAKING MACHINE

Filed July 9, 1924 6 Sheets-Sheet 6

Inventor:
Hendrik de Jong,
by
His Attorney.

Patented Aug. 30, 1927.

1,640,442

UNITED STATES PATENT OFFICE.

HENDRIK DE JONG, OF EINDHOVEN, NETHERLANDS, ASSIGNOR TO GENERAL ELECTRIC COMPANY, A CORPORATION OF NEW YORK.

STEM-MAKING MACHINE.

Application filed July 9, 1924, Serial No. 724,953, and in the Netherlands July 19, 1923.

This invention relates to machines for making stems for electric lamps and more particularly to machines for making stems for tipless lamps.

It has been already proposed to make stem making machines in which a rotary table is provided with a number of heads for holding various stem parts, each head being likewise rotary.

It has also been suggested to fix the heads on the rotary table and in such a machine which is also particularly adapted for manufacturing stems for tipless lamps. the heads are disposed radially in relation to the axis of the rotary table. This arrangement has various disadvantages. The construction of the heads is complicated. It is necessary that the burners for heating certain stem parts be disposed on movable levers in order to permit of their being moved out of range of the travelling heads. If a set of clamping jaws for the formation of the stem is provided, it is moreover necessary that also these clamping jaws be disposed on a movable lever in order to permit them to swing out of the way.

The present invention has for its object to obviate the said disadvantages and to ensure a simpler construction of the heads.

The machine according to the invention is provided in the known manner with a rotary table with a number of heads for holding the stem tube, leading-in wires within the stem tube, a rod or hub in alignment with the stem tube and if necessary an exhaust tube within the stem.

In order to permit of the heads being secured to the rotary table the latter is preferably provided with two or more rings which are so arranged one above the other that the axis of the table passes through the centre of each of the rings. The heads are secured to the rings by means of spindles vertically mounted in the rings. Furthermore the fingers belonging to each head may, according to the invention, be mounted on vertical spindles which are so located on both sides of the stem parts to be handled that the fingers can pivot on both sides respectively of the said parts.

The clamping jaws for the formation of the clamped portion can move in the machine according to the present invention in a vertical plane passing through the axis of the rotary table. The various portions of the machine are so constructed as to allow the stem parts lying beyond the clamped portion with their supports to pass freely between the opened jaws.

The machine is preferably provided with a device ensuring that the jaws close slowly and at decreasing speed during the formation of the clamped portion.

According to the present invention, this result may be obtained for example by arranging one of the levers for the transmission of motion from the pedal to the clamping jaws in such a manner that it reaches a dead point at the end of the closing movement of the clamping jaws.

The rotary table of the machine is locked at intervals in a predetermined position and so it is necessary that the table be unlocked as it has to continue its travel. It is of course obvious that the table should not be rotated at the moment when the clamping jaws are closed for the formation of the clamped portion, as otherwise the stem parts which are still soft would get out of the shape.

According to the invention it is possible to provide the machine with a device preventing the rotary table form being unlocked when the clamping jaws are closed. The operation of the jaws and the repeated unlocking of the rotary table is preferably effected by one pedal only and the table is only unlocked when the pedal moves upwards.

Various other characteristics of the machine according to the present invention relating particularly to the construction of the carriers, will be described hereinafter with reference to an embodiment of the invention.

The accompanying drawings illustrate diagrammatically an embodiment of the invention.

The machine shown in the drawings is operated by hand and moved at intervals according to the progress of the various steps of the operation to which the stems are submitted.

The number of heads which is necessary depends on the speed of the operation. In the machine shown in the drawings there are eight heads.

Figure 2:
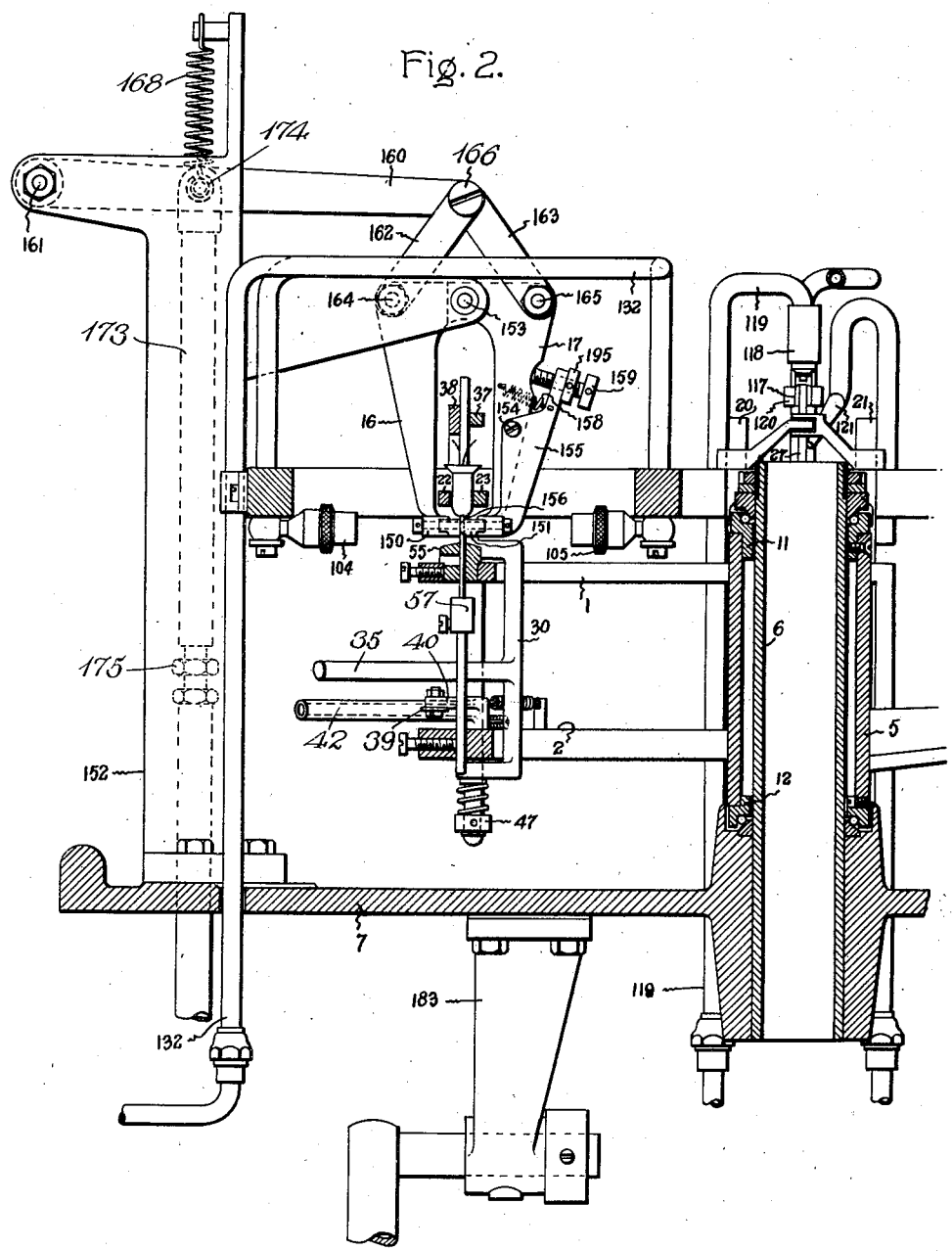
Figure 3:
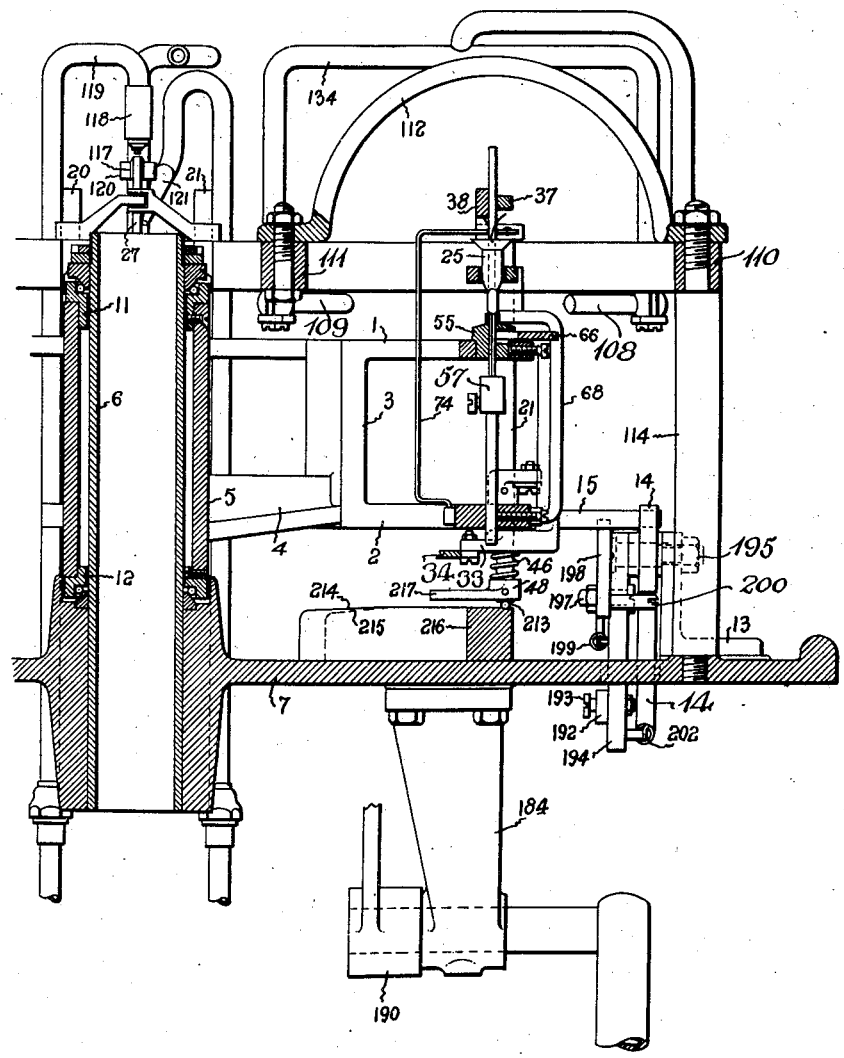
Figure 5:
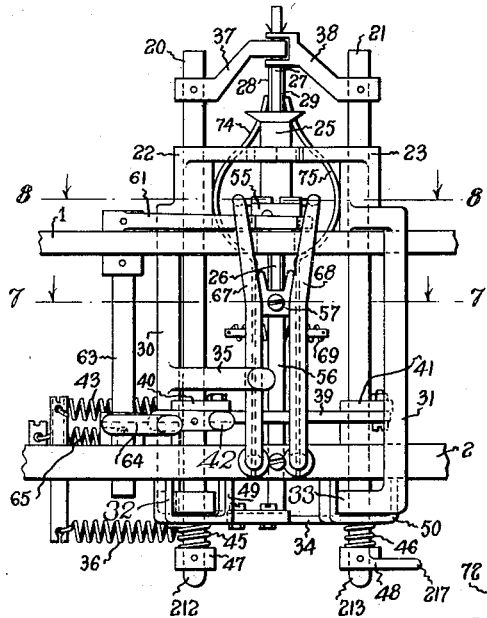
Figure 8:
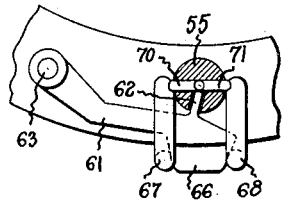
Figures 9, 10:
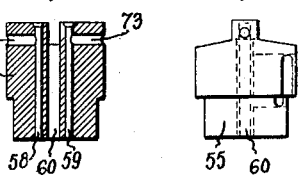
Figure 6:
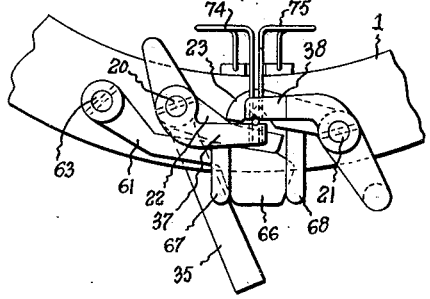
Figure 11:
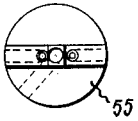
Figure 7:
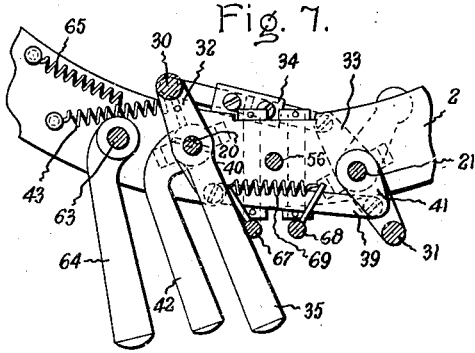
Figure 12:
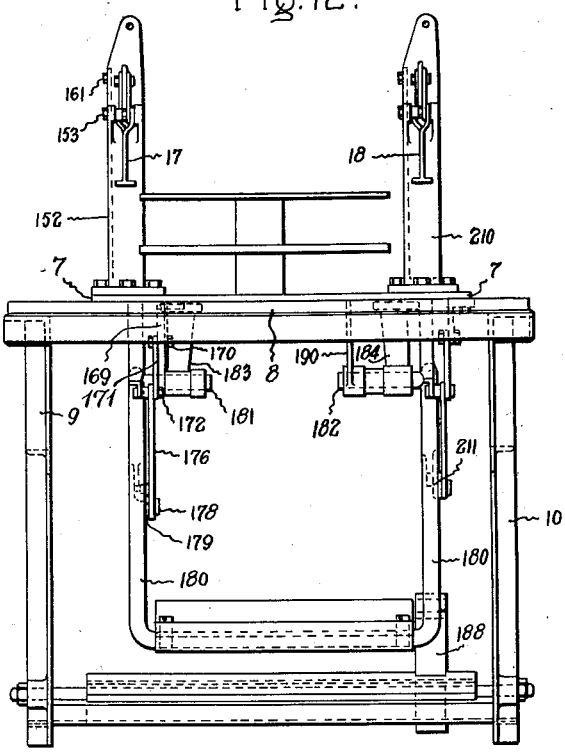
Figure 13:
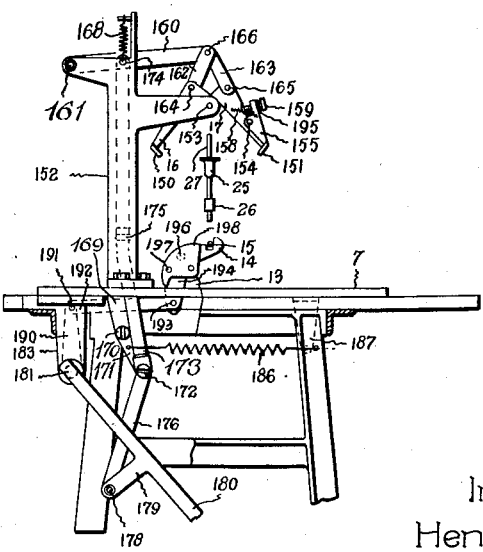

In these drawings Figure 1 is a plan of the machine; Fig. 2 is a vertical section taken on the line II—II of Fig. 1 looking in the direction of the arrows; Fig. 3 is a section taken on the line III—III—III—III of Fig. 1 looking in the direction of the arrows; Fig. 4 is a front elevation of the locking mechanism for periodically locking the table; Fig. 5 is a front elevation of one of the heads; Fig. 6 is a plan view of the same; Fig. 7 is a cross-section taken on the line VII—VII of Fig. 5; Fig. 8 is a section taken on the line VIII—VIII of Fig. 5; Fig. 9 is a vertical section of the block 55 shown in Fig. 5; Figs. 10 and 11 are a side elevation and a plan respectively of the same. For the sake of clearness, Figs. 9, 10 and 11 are illustrated on a large scale; Fig. 12 is a front elevation of the machine with both kinds of clamping jaws and the mechanism of the pedal, the other portions of the machine being left out for the sake of clearness. For the same reason the supports of the clamps have been turned to lie parallel to the plane of projection; Fig. 13 is a side elevation of Fig. 12; Figs. 14 and 15 are a front and a side elevation respectively of the finished stem.

A rotary table comprising rings 1 and 2 (see Figs. 2 and 3) which are rigidly connected together by supports 3 and are secured to a boss 5 by arms 4 is rotatable around a hollow post 6 firmly seated in a bed-plate 7. The latter rests on a table 8 supported by legs 9 and 10 (see Fig. 12).

The boss 5 is rotatable around the post 6 on ball-bearings 11 and 12 (Fig. 2).

The base-plate 7 carries a housing 13 (Fig. 13) provided with a latch 14. Pins 15 which are secured in the ring 2 are alternately engaged by the latch, the rotary table being thereby held in such a position as is necessary for allowing the stem parts to be successively submitted to the required operations.

Heads A to H inclusive secured to the rings 1 and 2 rotate around the post 6 and each can be held in eight successive positions.

The heads shown in Fig. 1 are illustrated in the positions in which they are successively held.

In position A the finished stem is withdrawn by the operator from the head which is possible as the pairs of fingers of the head are opened by one hand in a manner hereinafter described. After that the various stem parts, viz. the rod, the stem tube, the lead wires and the exhaust tube are placed in the heads in the proper relative position, whereupon the fingers are closed again.

The latch 14 is then released, and the rotary table is rotated for one eighth part of its circumference in the direction of the arrow shown in Fig. 1, whereupon the latch 14 is put again into the locking position so that the rotary table is held in the next position B. The stem parts brought to position B are preliminarily heated by burners 100 and 101 (Fig. 1). In the manner just described, the rotary table is moved step by step, each time for an eighth part of a revolution. In position C, the parts are fused together by burners 102 and 103 and this fusing operation is continued in position D by burners 104 and 105. On pushing down pedal 180 to which the latch 14 is connected, clamping jaws 16 and 17 (Figures 13 and 2) are closed. The so-called "clamped portion" is thereby formed and the parts fused together are closely connected to the lead wires thus ensuring a hermetic seal around the lead wires.

In position E (Fig. 1) by means comprising a nozzle an aperture 123 (Figs. 14 and 15) to the exhaust tube adjacent the fused juncture of the stem and exhaust tubes is blown in the stem whilst burners 106 and 107 soften the glass.

In position F the stem, after being blown through, is supplementally heated by burners 108 and 109 which prevents the clamped portion from cracking. Again in the said position clamping jaws 18 and 19 (Figs. 1 and 12) connected to the pedal 180 are closed to impress a mark on the clamped portion of the stem when the said pedal is pushed down.

It is necessary that after the clamping operation the glass fused together be reshaped in such a manner that the unions between the glass of the stem and that of the exhaust tube are rounded off. This is ensured by a device described hereinafter by means of which the exhaust tube is raised a short distance whereas the rod by a guide is prevented from following this movement. Consequently the glass is stretched where it is weakest and care is therefore taken that the glass be weakest where the stretching operation is desired. This stretching operation is effected when the head in question moves from position F to position G.

In positions G and H the stem is allowed to cool to such an extent that it can be withdrawn from the head without any danger of getting out of shape.

The burners 100 and 101, 102 and 103 etc. are secured to concentric supporting rings 110 and 111 (Fig. 1) tied together by braces 112 and 113 and resting on columns 114, 115 and 116 on the bed-plate 7. A mixture of gas and air is supplied to the burners through tubes, 130, 131, 132, 133 and 134.

After the above brief description of the operation of the machine, some portions of the machine will be described in detail.

A head illustrated on a large scale in the Figs. 5 to 11 inclusive is constructed as follows;

In the rings 1 and 2 (Figs. 5 and 6) of the rotary table are rotatably mounted two exhaust tube holding spindles 20 and 21 on which are loosely mounted stem holding fingers 22 and 23 to hold a stem 25 in its proper place.

The fingers 22 and 23 are carried on yokes 30 and 31 having arms 32 and 33 and rotatable around the spindles 20 and 21 and so connected together by an adjustable coupling-rod 34 that the fingers move at the same time but in opposite directions whilst rotating around the spindles 20 and 21.

By a correct choice of the length of the arms 32 and 33 it is possible to hold stems of different diameter properly centered in the fingers. The yoke 30 carries also a handle by means of which the fingers 22 and 23 can be opened against the action of a spring 36 which tends to close the said fingers.

Fingers 37 and 38 which serve to hold an exhaust tube 27, are rigidly joined to the spindles 20 and 21. The latter are connected together by a coupling-rod 39 and arms 40 and 41 rigidly secured to the spindles 20 and 21 to cause them to rotate at the same time and in the same direction.

The lever 40 also carries an arm 42 by means of which the fingers 37 and 38 can be opened against the action of a spring 43 which tends to close them. The length of the levers 40 and 41 is so chosen that regardless of its diameter, the centre line of the exhaust tube always coincides with the centre line of a stem clamped in the fingers 22 and 23.

Coil springs 45 and 46 between the collars 47 and 48 rigidly secured to the spindles 20 and 21 and the housings 49 and 50 on the ring 2 of the rotary table, tend to draw the spindles 20 and 21 downwards. The lowest position of the spindles 20 and 21 is determined because the levers 40 and 41 which as already observed are rigidly connected to 20 and 21 are provided with shoulders which engage the ring 2 of the rotary table. A glass cane or rod 26 (Fig. 5) and lead wires 28 and 29 are inserted in a block 55 (Figs. 5, 9 and 10) and engage a support 56 and a table 57, respectively. The latter can be shifted endwise on the support 56 which itself can be shifted vertically in the ring 2 so that glass rods and lead wires of any length may be used.

The block 55 serves to give the rod and the lead wires the desired direction and to protect the lead wires against burning. For this purpose apertures 58 and 59 for the lead wires and an aperture 60 for the rod are bored in the block 55. In order to facilitate the introduction of the lead wires and of the rod, the said apertures have a bore which is too great to sufficiently hold the rod 26 and the lead wires 27 and 28 and the glass rod and the wires are clamped in place by suitable fingers. In order that the rod be clamped in place and also held during the stretching operation described hereinafter an arm 61 with a finger 62 is provided. The arm 61 is rigidly connected to a spindle 63 rotatably mounted in the rings 1 and 2 of the rotary table. A handle 64 secured to the spindle 63 permits of the arm 61 with the finger 62 being drawn out of the block 55 against the action of a spring 65 which tends to so rotate the spindle that the finger 62 clamps the rod 26. As the arm 61 is moved outwards, a wedge-shaped nose 66 secured to 61 pushes itself between arms 67 and 68 hinged on the ring 2 and held together by a spring 69. The studs 70 and 71 fixed to the arms 67 and 68 are by this action drawn outwards to such an extent through apertures 72 and 73 serving to receive them that the apertures 58 and 59 are free to give passage to the lead wires.

The arms 67 and 68 which extend as spindles through ring 2 (see Figs. 5 and 7) in which they are positioned by adjusting rings, carry on the inner side of the ring 2 springs 74 and 75 respectively (Fig. 6), which follow the movement of the arms 67 and 68.

In order to permit of the heads being filled, the three handles 35, 42 and 64 are simultaneously drawn to the left by the left hand and this ensures that all carrying fingers and clamping jaws are opened. Obviously if desired the handles can also be so arranged as to permit of operating them by the right hand. After the stem 25 is inserted, the handle 35 is released so that the spring 36 closes the fingers 22 and 23 which position the stem 25 properly and in the correct direction.

The cane rod 26 and the lead wires 28 and 29 are then inserted (Fig. 5) and after that the exhaust tube 27 is put into its place. Thereupon the handle 42 is released and the fingers 37 and 38 are closed under the pull of the spring 43, thus centering and clamping the exhaust tube 21. Only then the handle 64 is released whereby the spring 65 causes the spindle 63 to rotate and thus causes the finger 62 of the arm 61 to engage the cane rod 26 so that the latter during the further manipulation is maintained in place. The retracting movement of the nose 66 connected to the arm 61 permits of the arms 67 and 68 being moved towards each other under the pull of the spring 69 until the studs 70 and 71 press the lead wires against the walls of the apertures 58 and 59 whereby the lead wires are centered and clamped. The same movement of the arms 67 and 68 causes also the springs 74 and 75 to move towards each other and the upper ends of the lead wires to close as tightly as possible against the exhaust tube thus ensuring the proper direction of the lead wires at the place where the clamped portion will be found later on.

The head is now filled and ready to be moved into position B for which purpose the latch 14 is temporarily disengaged by pushing down the pedal and subsequently allowing it to fall back. Just before reaching the position B, the latch is again released and locks the rotary table again at the proper moment.

In position B the stem parts are preliminarily heated by the burners 100 and 101 (Fig. 1). In the same period of time, the head which has arrived in position A is filled again if necessary after previously withdrawing a finished stem. After the head is filled, the machine is moved into the next position in the same manner as previously described so that the stem parts in the first head come from position B to position C.

In position C, the burners 102 and 103 fuse the glass of the stem, rod and exhaust tube at the place where the press will be made later on.

After the stem has moved from position C to position D, the fusing operation at the place where the press will be made later on is continued by the burners 104 and 105 and at the moment the pedal is pushed down and the first action for releasing the pawl consequently takes place, the press is formed by the jaws 150 and 151 (Figs. 2 and 13) of the clamping jaws 16 and 17. For obtaining a good product, it is necessary that the press be made relatively slowly, as otherwise the pressed glass would carry the leading-in wires 28 and 29 too much outwards and this would result in a bad seal around the leading-in wires or give rise to a crack in the press. In order that the pressing by the clamps 16 and 17 be effected at a relatively low speed the movement of the jaws is ensured in the following manner (see Figs. 2, 12 and 13):

To a housing 152 secured to the bed-plate 7, the clamps 16 and 17 are so pivoted as to be rotatable on an eccentric pivot 153. The clamp 17 carries a yoke 155 pivoted on it to rotate around a pin 154 and having two extending studs 156 which act as lugs for the jaw 150 to determine the thickness of the press of the stem. The yoke 155 is retained by a spring 158 whilst the desired position can be varied by a screw 159 and maintained by a nut 195. A clamp actuating lever 160 is also pivoted to the housing 152 and is rotatable on an eccentric pivot 161.

The clamps 16 and 17 are, by connecting links 162 and 163 which are rotatable on pivots 164 and 165, coupled to the lever 160 through a bolt 166 which serves as a hinge. The bolt 166 is rigidly pressed into the lever 160 in order to ensure but little clearance. By turning the eccentric bolts 153 and 161, it is possible to bring the engaging place of the jaws 150 and 151, and consequently the press of the stem accurately in the centre of the stem and to adjust the press into a somewhat higher or lower position. This may be necessary when the upper side of the block 55 after being used for some time is restored. The lever 160 is raised by a spring 168 suspended on the housing 152, the grip of the jaws 16 and 17 being thus normally released.

Under the bed plate 7 is mounted a housing 169 (Figs. 12 and 13), to which is secured a link 171 rotatable around a pivot 170.

This link 171 is by a bolt 172 rotatably connected to the link 173 the other end of which by a bolt 174 is rotatably connected to the lever 160. The length of the rod 173 is adjustable by a device 175 commonly used for this purpose.

By properly adjusting the length of the rod 173, it is possible to cause the jaws 16 and 17 to meet at the very moment when the pivots 174, 170 and 172 lie in a straight line. The link 171 is rotatably connected by the bolt 172 to a link 176, the other end of which is rotatably connected by a bolt 178 to a lug 179 of pedal 180. The pedal 180 swings on pins 181 and 182 (Fig. 12) in housings 183 and 184 fixed to the bed plate 7. By a spring 186 one end of which is secured to the link 171 and the other end of which is fixed to a housing 187, the pedal 180 is always drawn to the operator and the link 171 is moved into such a position that the jaws 16 and 17 are opened by treading upon the pedal, which movement as a rule is effected at an increasing speed, as the link 171 is moved into the position previously described in which the three pivots 174, 170 and 172 are in one line. In order that the range of the pedal 180 be limited a lug 188 (Fig. 12) is provided.

It is of course obvious that by the arrangement described the clamping jaws will be moved together at first at any selected speed but at the last part of their travel at decreasing speed so that at the moment the lugs 156 engage the jaw 150 and the press is formed, the speed is practically zero. Moreover the spring 168 which tends to keep the jaws open, prevents the various levers and links from shifting so that in spite of their kinetic energy the jaws are prevented from keeping too much speed at the end of their travel.

When the jaws 150 and 151 form the clamped portion of the stem, the latch 14 (Figs. 3 and 13) should not yet be disengaged as otherwise the rings 1 and 2 of the rotary table (Figs. 2 and 3) might be set in motion by involuntary movements of the operator so that the stem would obtain an undesired form and the heads with their spindles would be injured.

In order to comply with these conditions a second pedal may be provided which only operates the latch. This necessitates however two separate foot movements of the operator which have to take place consecutively in a predetermined order, and may therefore cause errors. Moreover the operating speed is thereby decreased.

In the machine shown in the drawing, one pedal operates both the jaws and the latch.

To pivot 182 (Fig. 12) of the pedal 180 is secured an arm 190 (Fig. 13) which by a bolt 191 is pivoted to a link 192. The other end of the link 192 is by bolt 193 rotatably connected to a lever 194 which can rotate around a bolt 196 rigidly fixed into the latch housing 13 for the latch 14 (see also Fig. 4). The housing 13 is rigidly mounted on the bed plate 7. A rocker 198 pivoted to rock on a pin 197, and responsive to the pull of a spring 199 fixed at one end to the lever 194 and at the other end to the rocker 198 carries a pin 200 serving as a hook to engage a nose 201 on the latch 14.

The latch 14 swings on a pin 195 and is coupled to the lever 194 by a draw spring 202. When the pedal 180 is pushed in order that the jaws 150 and 151 may form the press of the stem, the latch 14 engages a pin 15 secured in the ring 2 (Fig. 3) of the rotary table. Thereupon the lower end of the lever 194 as shown in Fig. 4 is moved to the right by the lever 190 (Fig. 12) and the link 192 (Figs. 3 and 4), whereby the draw spring 202 is strained. Eventually the rocker 198 drawn along with lever 194 by the spring 199 snaps the pin 200 over the nose 201 of the lever 14 and then continues its movement for a little while until the lugs 156 engage the jaw 150 as described before. As the pedal 180 returns, the grip of the jaws 150 and 151 is released and the pin 200 engages the nose 201 of the latch 14, which is unlatched when the jaws are so far opened that the rotary table is free to turn. The latch 14 is then maintained in the disengaged position until the rotary table with the rings 1 and 2 and with it the heads have so far rotated in the direction of the arrow shown in Fig. 1 that the pin 15 engages the rocker 198 and forces it down. The shape of the rocker 198 (Fig. 4) is so chosen that the pin 200 snaps off the nose 201 so that the latch 14 is released and snaps upwards under the pull of the spring 202 whilst moving on the pin 195.

The pin 15 which thus has released the pawl 14 then brushes past the back 203 of the latch 14 until it is held in a notch 204 whereby the movement of the rotary table is stopped and it is held in the proper position.

At position E where the carrier has then arrived, the means for producing enough pressure in the exhaust tube to form the passage 123 become operative, and the flames of the burners 106 and 107 soften the stem near the press and somewhat beyond it to such an extent that air blown into the exhaust tube through a nozzle 117 will expand somewhat the exhaust tube 27 near the press and on continued blowing form an aperture 123 through the fused walls of the exhaust tube 27 and the stem 25. The nozzle 117 (Fig. 2) is movably suspended on a rubber tube 118 slid over the air jet 119 and is properly positioned (see Fig. 2) by a gooseneck 120.

A nozzle 121 permits of air being blown between the exhaust tube and the stem so that a pressure slightly above atmospheric pressure is formed in the annular space 122 (Fig. 15).

Thus the wall of the stem 25 is prevented from collapsing which otherwise might give rise to cracking of the glass after the stem has cooled. The rotary table is then moved to position F in the same manner as already described for the preceding positions. In the said position F the flames of the burners 108 and 109 tend to fuse away the sharp edges of the aperture 123 blown in at position E and to heat the press to such an extent that the mark found on one of the jaws 18 and 19 or on both can be impressed in the glass without injury. The jaws 18 and 19 (Fig. 1), are suspended at position F on a housing 210 (Fig. 12) rigidly fixed to the bed plate 7.

The jaws 18 and 19 are actuated in the same manner as the jaws 16 and 17. For this purpose the pedal 180 has fixed thereto a lug 211.

It follows from the above that both the pressing in position D and the marking in position F are effected by one and the same pedal at the same time by treading on the pedal.

During the travel of the carrier from position F to position G, the ends 212 and 213 (Fig. 5) of the spindles 20 and 21 contact with inclines 214 and 215 (Fig. 3) of a track 216 rigidly mounted on the bed plate 7.

As is clearly shown on the drawing (Figs. 1 and 3) the spindles 20 and 21 are thereby forced to move upwards against the action of the springs 45 and 46, sliding in their guide-ways in the rings 1 and 2 and in the stem tube fingers 22 and 23 (Fig. 5) which hold the stem 25. As the spindles 20 and 21 and the exhaust tube fingers 37 and 38 which are connected to them and hold the exhaust tube 27 move upwards, the end of exhaust tube 27 held by the said fingers 37 and 38 is taken upwards along with them whereby the lower end of the exhaust tube 27 and a part of the clamped portion 124 of the stem, which parts are still soft, are stretched. This stretching operation has for its object to round off the unions between the wall of the stem and that of the exhaust tube. By rounding off the said unions there is less probability of cracks occurring in the cooled stem. In position G, the track 216 is level and the stem is permitted to cool likewise in H into which position the stem is moved in the next periodical movement. During the travel from position H to position A, a finger 217 of an adjusting ring 48 (Fig. 1) rides on a track 218 rigidly mounted on the bed plate. The track 218 forces the finger 217 to rotate the pivot 21 thus causing the fingers 37 and 38 secured on to the spindles 20 and 21 to open (the spindles 20 and 21 have already been described as coupled by the levers 40 and 41 and the links 39).

The track 216 which under the force of the springs 45 and 46 is engaged by the spindles 20 and 21, slopes downward after the track 218 has opened the fingers 37 and 38 so that the spindles move downwards again and along with the shoulders of levers 40 and 41 engage the ring 2 of the rotary table, (Fig. 5). A short distance before position A is reached the track 218 terminates, with a slight incline towards the centre of the machine, the finger 217 is thus released and the fingers 37 and 38 are closed under the pull of the spring 43. In position A the completed stem can be unloaded and the fingers filled again with the parts of a new stem to be made.

It is, of course, obvious that the sequence of operations and actions previously described for one head, is the same for all heads.

What I claim as new and desire to secure by Letters Patent of the United States, is:

1. In a machine of the character described, the combination of a post, a table rotatably mounted on said post and comprising two parallel rings concentric with said post, and stem heads mounted on said rings, each head comprising a spindle rotatably journalled in said rings parallel to said post, fingers on said spindle and cooperating fingers on said table for supporting a stem tube and an exhaust tube with their ends juxtaposed, and means for holding leading-in wires within said stem tube.

2. In a machine of the character described, the combination of a rotary table and a stem head mounted on said table, and comprising two rotatable spindles journalled side by side on the edge of said table and parallel to the axis of rotation of said table and provided with rigid cooperating fingers for holding an exhaust tube, stem tube fingers rotatably mounted on said spindles, means for holding leading-in wires inside said stem tube, and means for actuating said spindles and said stem tube fingers independently of each other.

3. In a machine of the character described, the combination of a rotary table and a plurality of heads mounted on said table, each head comprising a pair of rotatable and longitudinally movable spindles mounted on said table, cooperating exhaust tube fingers on said spindles for holding an exhaust tube, cooperating stem tube fingers loosely mounted on said spindles to hold between them a stem tube concentric with said exhaust tube, means for holding leading-in wires between said stem tube and said exhaust tube, means for fusing the adjacent ends of said tubes, means for actuating said stem tube fingers independently of said spindles, and means for producing relative movement between said stem tube fingers and said exhaust tube fingers longitudinally of said spindles to stretch the exhaust tube slightly near its fused end.

4. In a machine of the character described, the combination of a rotary table, a stem head on said table comprising cooperating stem tube fingers rotatably mounted on said table to hold a stem tube, means for holding leading-in wires in position in said stem tube, a pair of spindles rotatably and longitudinally mounted on said table, cooperating exhaust tube fingers secured to said spindles to hold an exhaust tube concentric with said stem tube, means for fusing the juxtaposed ends of said tubes, and a stationary cam mounted adjacent said table in the path of travel of the lower ends of said spindles and shaped to cause said spindles to move away from said stem tube fingers during a predetermined portion of the travel of said table while a portion of said exhaust tube is still plastic.

5. In a machine of the character described, a stem head comprising cooperating fingers for holding a stem tube and an exhaust tube concentric with each other, and a block in alignment with said fingers having one aperture for a glass support rod, and other apertures for holding leading-in wires inside said stem tube, a clamping member movable into said one aperture to clamp the glass support rod in place in said block, and means for automatically retracting said clamping member to release said support rod.

6. In a machine of the character described, a stem head comprising means for holding a stem tube, means for holding an exhaust tube concentric with said stem tube, and means for holding leading-in wires in said stem tube comprising a block having apertures for receiving the leading-in wires, clamping studs resiliently mounted to move into said apertures and clamp the leading-in wires therein to said block, and means for retracting said studs from said block to release the leading-in wires.

7. In a machine of the character described, a stem head comprising stem tube fingers and exhaust tube fingers mounted to hold a stem tube and an exhaust tube concentric, a leading-in wire holder comprising an apertured block, clamping studs mounted to move into and out of the apertures in said block to clamp said leading-in wires to said block, actuating levers for said studs, and resilient arms on said levers to press the leading-in wires against the exhaust tube while said studs are in clamping position.

8. In a machine of the character described, the combination of a frame, a rotary table on said frame, a plurality of stem heads mounted on said table for holding a stem tube and leading-in wires in proper relation, means adjacent the path of travel of said heads for heating one end of said stem tube, a support on said frame above the path of said heads, clamping jaws suspended from a pivot on said support, and actuating means for bringing said jaws together on the softened end of the stem tube in said head and comprising a pedal, a pivoted arm actuated by said pedal, and a link pivoted to said arm and connected to said jaws so that the pivots of said arm and said link are in line when said clamping jaws are fully closed.

9. A machine of the character described comprising a movable table and a non-rotatable stem head mounted on said table and comprising spindles journalled in the edge of said table, means positioned on said spindle for holding a stem tube, cooperating fingers fixed to said spindles to hold an exhaust tube, and means for holding leading-in wires in proper relation to said tubes.

10. In a machine of the character described, the combination of stem tube and exhaust tube supports mounted to be bodily movable relative to each other, and normally in registry to hold an exhaust tube and a stem tube concentric, means associated with said supports for fusing in juncture adjacent portions of a stem tube and exhaust tube in said supports, means for establishing a passage to said exhaust tube adjacent the fused juncture, and actuating means for moving said supports bodily away from each other while the fused juncture is plastic and thereby stretching the fused glass.

11. In a machine of the character described, the combination of a stem tube support, an exhaust tube support for holding an exhaust tube concentric with the stem tube in said stem tube support and mounted to be bodily movable away from said stem tube support, means for fusing in juncture adjacent portions of said tubes, means for producing gas pressure in said exhaust tube while said juncture is plastic and thereby forming a passage, and actuating means for moving said exhaust tube holder away from said stem tube holder while said juncture is plastic and thereby stretching the plastic glass.

12. In a machine of the character described, the combination of a movable table, a stem head mounted on said table and comprising cooperating supports normally in registry for holding a stem tube and an exhaust tube concentric, one of said supports being bodily movable lengthwise of said tubes, a leading-in wire holder adjacent said stem tube supports, means for fusing in juncture adjacent portions of the tubes in said holders, and actuating means responsive to the movement of said table to move said movable support bodily away from the other support while said juncture is plastic.

13. In a machine of the character described, the combination of a movable table, a stem head mounted on said table and comprising cooperating supports normally in registry for holding a stem tube and an exhaust tube concentric, one of said supports being bodily movable lengthwise of said tubes, a leading-in wire holder adjacent said stem tube supports, a cane support for holding a glass rod with its end adjacent the juxtaposed ends of the stem tube and exhaust tube in said holders, means for fusing together the juxtaposed ends of said tubes and said rod, a rod clamp associated with said cane support, and actuating means controlled by said table for clamping said rod in said cane support and moving said exhaust tube support bodily away from said stem tube support while the fused glass is still plastic.

In witness whereof, I have hereunto set my hand this eighteenth day of June, 1924.

HENDRIK DE JONG.